(12) United States Patent
Boyce et al.

(10) Patent No.: US 9,148,694 B2
(45) Date of Patent: Sep. 29, 2015

(54) METHOD AND APPARATUS ENABLING FAST CHANNEL CHANGE FOR DSL SYSTEM

(75) Inventors: Jill MacDonald Boyce, Manalapan, NJ (US); Alexandros Tourapis, Santa Clara, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 417 days.

(21) Appl. No.: 11/579,204

(22) PCT Filed: Apr. 21, 2005

(86) PCT No.: PCT/US2005/013800
§ 371 (c)(1),
(2), (4) Date: Oct. 31, 2006

(87) PCT Pub. No.: WO2005/112465
PCT Pub. Date: Nov. 24, 2005

(65) Prior Publication Data
US 2007/0248165 A1   Oct. 25, 2007

Related U.S. Application Data

(60) Provisional application No. 60/567,483, filed on May 3, 2004.

(51) Int. Cl.
*H04N 21/438*  (2011.01)
*H04N 21/4363*  (2011.01)
(Continued)

(52) U.S. Cl.
CPC ....... *H04N 21/4363* (2013.01); *H04N 7/17318* (2013.01); *H04N 21/2381* (2013.01);
(Continued)

(58) Field of Classification Search
CPC ................. H04N 21/4384; H04N 21/4383
USPC .......................... 725/105, 106, 122
See application file for complete search history.

(56) References Cited

U.S. PATENT DOCUMENTS 6,118,498 A * 9/2000 Reitmeier .............. 348/725
6,243,421 B1 * 6/2001 Nakajima et al. ........ 375/240.25
(Continued)

FOREIGN PATENT DOCUMENTS

| JP | 2006527974 | 12/2004 |
|---|---|---|
| JP | 2005168004 | 6/2005 |

(Continued)

OTHER PUBLICATIONS

Patent Abstracts of Japan, 2001292381, Canon Inc., "Receiving Device, Reception System, Receiving Method and Storage Medium", Oct. 19, 2001.

(Continued)

*Primary Examiner* — Robert Hance
(74) *Attorney, Agent, or Firm* — Robert D. Shedd; Vincent E. Duffy; Palak Bhakta

(57) ABSTRACT

There is provided methods and apparatus for enabling a fast channel change for a Digital Subscriber Line (DSL) system. A channel change processing unit for enabling a channel change in a DSL system includes a demultiplexer and a selector in signal communication with the demultiplexer. The demultiplexer is for receiving a normal stream and a channel change stream. The selector is for receiving a channel change request and for sending the channel change stream in response to receiving the channel change request. The channel change stream coded pictures are of a lower quality than the normal stream coded pictures.

30 Claims, 4 Drawing Sheets

(51) Int. Cl.
*H04N 7/173* (2011.01)
*H04N 21/231* (2011.01)
*H04N 21/234* (2011.01)
*H04N 21/2381* (2011.01)
*H04N 21/434* (2011.01)
*H04N 21/44* (2011.01)
*H04N 21/61* (2011.01)
*H04L 12/18* (2006.01)

(52) U.S. Cl.
CPC ... *H04N21/23106* (2013.01); *H04N 21/23424* (2013.01); *H04N 21/434* (2013.01); *H04N 21/4381* (2013.01); *H04N 21/4383* (2013.01); *H04N 21/4384* (2013.01); *H04N 21/44016* (2013.01); *H04N 21/6137* (2013.01); *H04L 12/18* (2013.01)

(56) References Cited

U.S. PATENT DOCUMENTS

| | | | |
|---|---|---|---|
| 6,651,089 B1 * | 11/2003 | Stead | 709/217 |
| 6,697,425 B1 * | 2/2004 | Nakagawa et al. | 375/240 |
| 7,430,222 B2 * | 9/2008 | Green et al. | 370/486 |
| 7,457,415 B2 * | 11/2008 | Reitmeier et al. | 725/31 |
| 7,562,375 B2 * | 7/2009 | Barrett et al. | 725/38 |
| 2002/0064226 A1 | 5/2002 | Bauer et al. | |
| 2003/0083114 A1 | 5/2003 | Lavin et al. | |
| 2003/0169724 A1 * | 9/2003 | Mehta et al. | 370/352 |
| 2003/0196211 A1 * | 10/2003 | Chan | 725/131 |
| 2004/0003399 A1 | 1/2004 | Cooper | |
| 2004/0034863 A1 * | 2/2004 | Barrett et al. | 725/38 |
| 2004/0034864 A1 | 2/2004 | Barrett et al. | |
| 2004/0160974 A1 * | 8/2004 | Read et al. | 370/431 |
| 2004/0181813 A1 * | 9/2004 | Ota et al. | 725/131 |
| 2005/0053086 A1 * | 3/2005 | Mehta et al. | 370/432 |
| 2005/0117055 A1 * | 6/2005 | Kerofsky | 348/438.1 |
| 2005/0138668 A1 * | 6/2005 | Gray et al. | 725/110 |
| 2005/0229221 A1 * | 10/2005 | Kerofsky et al. | 725/100 |
| 2006/0117360 A1 * | 6/2006 | Cooper et al. | 725/100 |

FOREIGN PATENT DOCUMENTS

| | | |
|---|---|---|
| JP | 2006527975 | 12/2006 |
| WO | WO0057646 | 9/2000 |
| WO | WO 03/063507 A1 | 7/2003 |
| WO | 03107701 | 12/2003 |
| WO | 2004114668 | 12/2004 |

OTHER PUBLICATIONS

Patent Abstracts of Japan, 10190617, Matsushita Electric Ind. Co. Ltd., Video Signal Decoding Device, Jul. 21, 1998.
European Search Report, Jul. 5, 2005.
Japanese Office Action dated Jan. 14, 2011.
Indian Office Action dated Sep. 1, 2013.

* cited by examiner

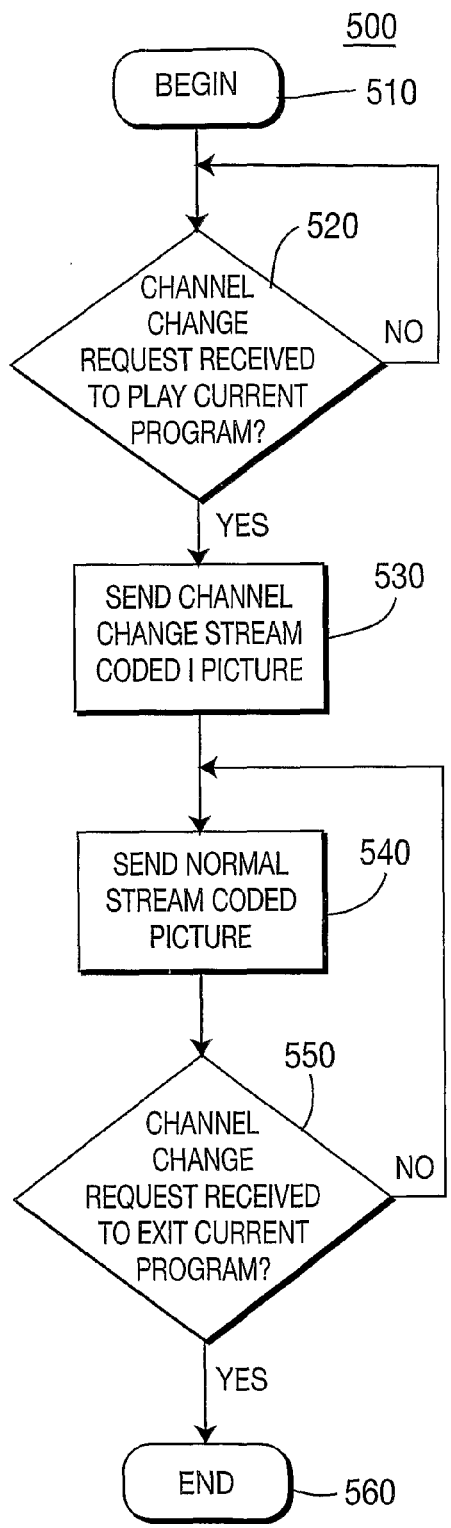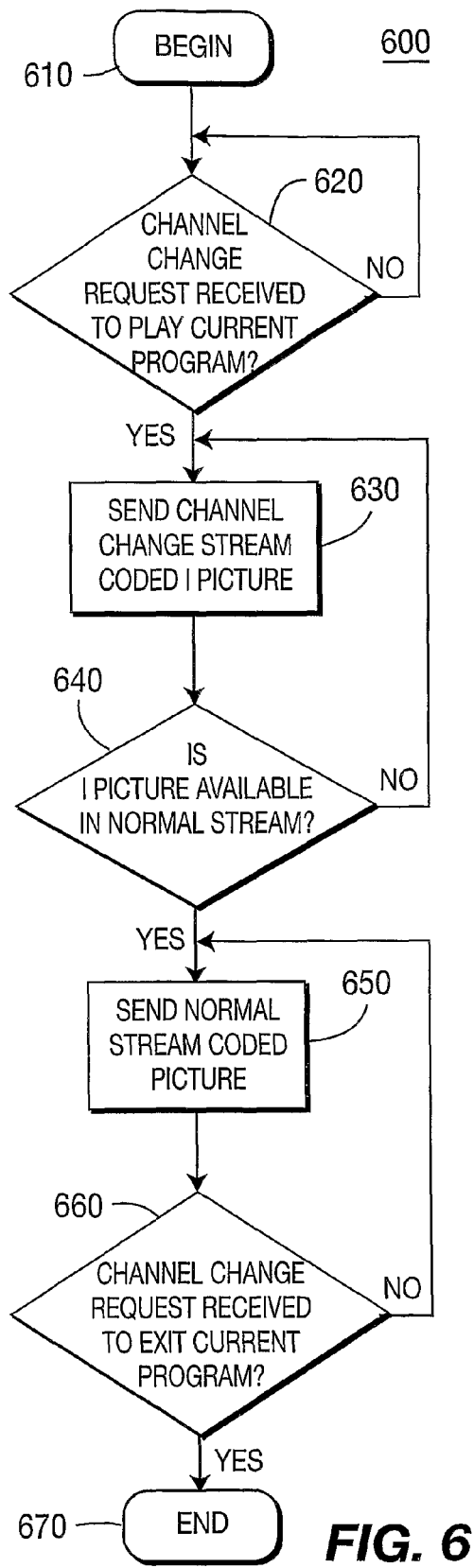
FIG. 5
FIG. 6

US 9,148,694 B2

METHOD AND APPARATUS ENABLING FAST CHANNEL CHANGE FOR DSL SYSTEM

CROSS-REFERENCE TO RELATED APPLICATIONS

This application claims the benefit, under 35 U.S.C. §365 of International Application PCT/US2005/013800, filed Apr. 21, 2005 which was published in accordance with PCT Article 21(2) on Nov. 24, 2005 in English and which claims the benefit of U.S. provisional patent application No. 60/567,483 filed May 3, 2004.

GOVERNMENT LICENSE RIGHTS IN FEDERALLY SPONSORED RESEARCH AND DEVELOPMENT

The U.S. Government has a paid-up license in this invention and the right in limited circumstances to require the patent owner to license others on reasonable terms as provided for by the terms of project ID Contract No. 2003005676B awarded by the National Institute of Standards and Technology.

FIELD OF THE INVENTION

The present invention generally relates to Digital Subscriber Line (DSL) systems and, more particularly, to a method and apparatus for enabling a fast channel change for a DSL system.

BACKGROUND OF THE INVENTION

In a commercial video over DSL broadcast system, it is desirable to allow end users to be able to change channels rapidly. Popular video compression standards, such as MPEG-2 and JVT/H.264/MPEG AVC use intra and inter coding. For proper decoding, a decoder must decode a compressed video sequence beginning with an intra-coded (I) picture, and then continue to decode the subsequent inter-coded (P and B) pictures. A Group of Pictures (GOP) may include an I picture and several subsequent P and B pictures. I pictures typically require many more bits to code than does a P or B picture of equivalent video quality, in the range of 3 to 10 times more bits. When a receiver initially begins receiving a program on a particular channel, following a channel change or initial turning on of the receiver, it must wait until an I picture is received to begin decoding properly, which causes a delay.

To minimize channel change delay in digital video broadcast systems, I pictures are typically sent frequently, for example every N pictures. For example, to enable a ½ second delay (of the video compression portion of the system), it is common to use N=15 for 30 frames per second (fps) content. Since compressed I pictures are so much larger than compressed P and B pictures, this considerably increases the bitrate over what would be required if I pictures were not inserted so frequently.

In some systems, instead of sending full I pictures frequently, a technique called "progressive refresh" is used, where sections of pictures are intra coded. Typically, all macroblocks in the picture are intra-coded at least once during an N-picture period. In the JVT/H.264/MPEG AVC compression standard, P and B pictures may be predicted using multiple reference pictures, including the pictures before a preceding I picture. The standard identifies random access points as Independent Decoder Refreshes, or IDRs, which constrain that no reference pictures before the IDR are used in predicting pictures following the IDR. Pictures may be coded using slices of different types. A picture in which all coded slices are of type I may be referred to as an I picture.

The JVT/H.264/MPEG AVC compression standard includes a tool called redundant pictures, defined in the standard as follows:

redundant coded picture: A coded representation of a picture or a part of a picture. The content of a redundant coded picture shall not be used by the decoding process for a bitstream conforming to this Recommendation I International Standard. A redundant coded picture is not required to contain all macroblocks in the primary coded picture. Redundant coded pictures have no normative effect on the decoding process. See also primary coded picture.

The slice header contains a redundant_pic_cnt field, whose semantics are defined in the JVT/H.264/MPEG AVC compression standard as follows:

redundant_pic_cnt shall be equal to 0 for slices and slice data partitions belonging to the primary coded picture. The redundant_pic_cnt shall be greater than 0 for coded slices and coded slice data partitions in redundant coded pictures. When redundant_pic_cnt is not present, its value shall be inferred to be equal to 0. The value of redundant_pic_cnt shall be in the range of 0 to 127, inclusive.

If the syntax elements of a slice data partition A RBSP indicate the presence of any syntax elements of category 3 in the slice data for a slice, a slice data partition B RBSP shall be present having the same value of slice_id and redundant_pic_cnt as in the slice data partition A RBSP.

Otherwise (the syntax elements of a slice data partition A RBSP do not indicate the presence of any syntax elements of category 3 in the slice data for a slice), no slice data partition B RBSP shall be present having the same value of slice_id and redundant_pic_cnt as in the slice data partition A RBSP.

A system has been proposed wherein a channel change stream is encoded and transmitted along with the normal video bitstream. The channel change stream includes lower quality I pictures that are sent at a higher frequency than I pictures in the normal bitstream. When a user tunes to a new channel, playback could begin upon receipt of the first I pictures, in either the normal or channel change stream. This system is targeted at an end-to-end broadcast system, without any upstream indication of a channel change or possibility for storage at intermediate points in the system. By incorporating upstream channel change indications and/or intermediate storage points, the present invention can reduce bandwidth requirements over the most bandwidth critical links of the end-to-end system and increase channel change response time.

Another system has been proposed wherein a reduced resolution update codec is employed such that prediction residuals can be coded at lower resolutions for some of the coded pictures in a sequence, while other coded pictures in a sequence are coded at the full resolution. However, this system does not provide any capability for improved channel change efficiency.

SUMMARY OF THE INVENTION

These and other drawbacks and disadvantages of the prior art are addressed by the present invention, which is directed to a method and apparatus for enabling a fast channel change for a DSL system. Advantageously, the present invention advantageously allows for a channel change delay at any desired rate at a lower bitrate than prior art methods.

According to an aspect of the present invention, there is provided a channel change processing unit for enabling a channel change in a Digital Subscriber Line (DSL) system. The channel change processing unit includes a demultiplexer and a selector in signal communication with the demultiplexer. The demultiplexer is for receiving a normal stream and a channel change stream. The selector is for receiving a channel change request and for sending the channel change stream in response to receiving the channel change request. The channel change stream coded pictures are of a lower quality than the normal stream coded pictures.

According to another aspect of the present invention, in a set top box coupled to a Digital Subscriber Line (DSL) system and having a user interface for transmitting a channel change request, there is provided a video decoder for enabling a channel change. The video decoder includes a decoder for receiving and decoding a normal stream and a channel change stream. The normal stream has normal stream coded pictures and the channel change stream has channel stream coded pictures of a lower quality than the normal stream coded pictures.

According to yet another aspect of the present invention, in a content provider coupled to a Digital Subscriber Line (DSL) system, there is provided a video encoder for enabling a channel change. The video encoder includes an encoder for coding a normal stream having normal stream coded pictures and for coding a channel change stream having channel change stream coded pictures, such that the channel change stream coded pictures are coded at a lower quality than the normal stream coded pictures.

According to a further aspect of the present invention, in a channel change processing unit of a Digital Subscriber Line (DSL) system, there is provided a method for enabling a channel change. The method includes the steps of: receiving a normal stream and a channel change stream; receiving a channel change request; and sending the channel change stream in response to receiving the channel change request. The channel change stream coded pictures are of a lower quality than the normal stream coded pictures.

According to a yet further aspect of the present invention, in a set top box coupled to a Digital Subscriber Line (DSL) system and having a user interface for transmitting a channel change request, there is provided a decoding method for enabling a channel change. The method includes the steps of receiving and decoding one of a normal stream and a channel change stream. The normal stream has normal stream coded pictures and the channel change stream has channel stream coded pictures of a lower quality than the normal stream coded pictures.

According to an additional aspect of the present invention, in a content provider coupled to a Digital Subscriber Line (DSL) system, there is provided an encoding method for enabling a channel change. The encoding method includes the steps of coding a normal stream having normal stream coded pictures and coding a channel change stream having channel change stream coded pictures, such that the channel change stream coded pictures are coded at a lower quality than the normal stream coded pictures.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 5 shows a flow diagram for a method for enabling a channel change in a Digital Subscriber Line (DSL) system with prediction drift in accordance with the principles of the present invention;

FIG. 6 shows a flow diagram for a method for enabling a channel change in a Digital Subscriber Line (DSL) system without prediction drift in accordance with the principles of the present invention.

DETAILED DESCRIPTION OF PREFERRED EMBODIMENTS

Figure 1:
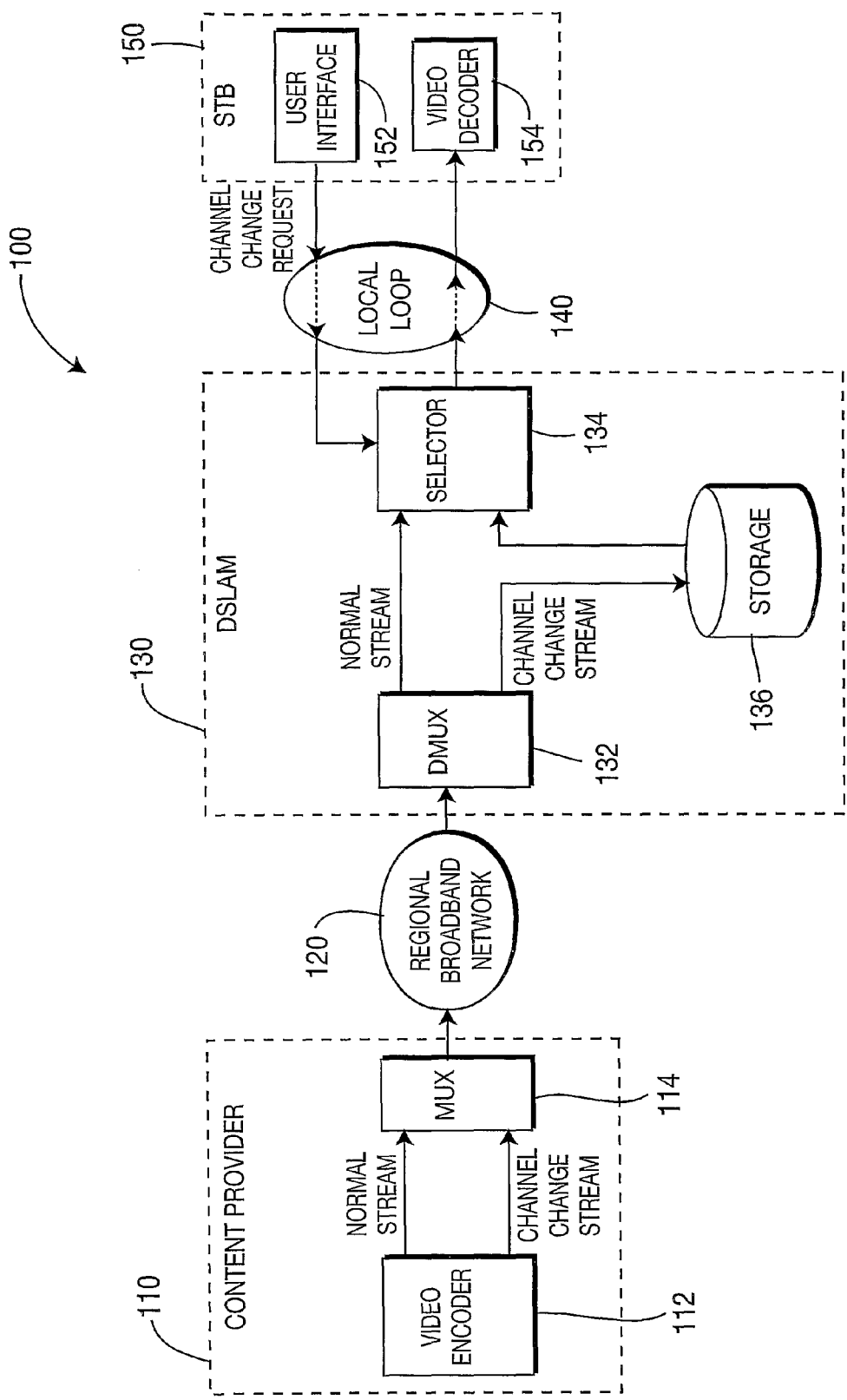
FIG. 1 shows a block diagram for an end-to-end architecture in accordance with the principles of the present invention.

The present invention is directed to a method and apparatus for enabling a fast channel change for a Digital Subscriber Line (DSL) system. That is, the present invention provides a method and apparatus that enable a low delay channel change time in a video over DSL system, while significantly reducing the bitrate over prior methods of enabling low delay channel change.

Prior art systems broadcast I pictures frequently to enable channel change, for example every N pictures. According to the present invention, I pictures are used less frequently, and a lower bitrate channel change bitstream is also encoded and stored at the DSL Access Multiplexer (DSLAM). When a user requests a channel change, the stored lower bitrate channel change bitstream is sent to the user, allowing for rapid channel change, while minimizing the total bitrate over the DSL local loop.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

In accordance with the principles of the present invention, a desired channel change delay can be achieved without requiring I pictures to be sent as frequently as is performed in prior art systems. Instead, a channel change stream is encoded that includes lower quality coded pictures, in addition to the normal quality coded pictures in the normal stream. In response to a request for channel change, channel change stream pictures are sent from a DSLAM to the set-top-box for a transient period, and then normal stream pictures are sent. Each picture in the channel change stream is associated with a normal stream picture, but not all pictures present in the normal stream need to have an associated picture in the channel change stream. Coded pictures in the channel change stream may be optionally, but not necessarily, coded at a lower resolution than pictures in the normal stream. I pictures occur more frequently in the channel change stream, to enable more frequent random access. The most recent I picture and the P and B pictures subsequently coded, if any, may be optionally, but not necessarily, stored at the DSLAM. An I picture and the P and B pictures coded subsequently to the I picture are referred to as a Group of Pictures (GOP).

Turning to FIG. 1, an exemplary end-to-end architecture to which the present invention may be applied is indicated generally by the reference numeral 100. The architecture 100 includes a content provider 110, a regional broadband network 120, a digital subscriber line access multiplexer (DSLAM) 130, a local loop 140, and a set top box (STB) 150. The content provider 110 includes a video encoder 112 having a first and a second output in signal communication with a first and second input, respectively, of a multiplexer 114. An output of the multiplexer 114 provides an output of the content provider 110, which is connected in signal communication with the regional broadband network 120. The regional broadband network 120 is further connected in signal communication with an input of the DSLAM 130.

The DSLAM 130 includes a demultiplexer 132 having a first output in signal communication with a first input of a selector 134 and a second output in signal communication with an input of a local storage device 136. An output of the storage device 136 is connected in signal communication with a second input of the selector 134. A first input of the DSLAM 130 is connected in signal communication with an input of the demultiplexer 132, a second input of the DSLAM 130 is connected in signal communication with a third input of the selector 134, and an output of the DSLAM 130 is connected in signal communication with an output of the selector 134. The second input and the output of the DSLAM 130 are connected in signal communication with the local loop 140. It is to be appreciated that the DSLAM 130 is also interchangeably referred to herein as a "channel change processing unit".

The STB 150 includes a user interface 152 and a video decoder 154. An output of the STB 150 is connected in signal communication with the local loop 140 and with the user interface 152, and an input of the STB 150 is connected in signal communication with the local loop 140 and with the video decoder 154.

The video encoder 112 creates both a normal stream and a channel change stream of coded pictures. The normal stream and channel change stream are multiplexed 114 together and transmitted over a regional broadband network 120 to the DSLAM 130. For the sake of simplicity with respect to FIG. 1, only a single program's encoder is shown. In an actual system, multiple programs are supported and, thus, blocks in the figure are duplicated for each supported program. A user makes a channel change request through the user interface 152 in the STB 150, to indicate a switch to a new program to be viewed. This request is forwarded to the DSLAM 130.

In a preferred embodiment of the present invention, the channel change stream is stored in storage local (e.g., local storage device 136) to the DSLAM 130 (or remote storage which may be quickly accessed by the DSLAM 130). During normal viewing, the normal stream is transmitted over the local loop 140 to the video decoder 154 at the STB 150. When a channel change request is initiated by the user interface of the STB 150, it is sent to the DSLAM 130 through the local loop 140. Upon receiving the channel change request, the DSLAM 130 begins to send the stored channel change stream of the new program to the STB 150, beginning with an I picture in the channel change stream, instead of the normal stream. Then, at a later point, the DSLAM 130 switches back to transmitting the normal stream to the STB 150.

In one embodiment of the current invention, the switch back to transmitting the normal stream is done once an I picture is available in the normal stream. In this case, an entire Group Of Picture's (GOP's) worth of channel change stream coded pictures are used after a channel change request. When used in an embodiment that includes storage of the channel change pictures at the DSLAM, a new I picture in the channel change stream is received at the DSLAM 130, the previously stored channel change stream coded pictures may be replaced with the pictures in the new GOP.

In another embodiment, only I pictures are present in the channel change stream, and the switch back to the normal stream takes place immediately after the channel change stream I picture is sent. In this case, only a single channel change stream I coded picture needs to be stored. When a new I picture in the channel change stream is received, it may replace in the storage the previously stored channel change stream I picture.

Sending the channel change stream in addition to the normal stream increases the bandwidth requirement over the regional broadband network 120. However, reducing the frequency with which I pictures are coded in the normal stream reduces the bandwidth requirement for the normal stream. Over the more highly constrained local loop 140, pictures in the channel change stream are only transmitted when normal pictures are not, so a reduction in bandwidth in the local loop 140 is always observed in accordance with this invention versus the prior art. In addition, channel change latency is reduced. In a prior art system, playback after a channel change could only begin after an I picture for the new program was received at the STB 150. There are several components associated with that delay, including the period of time until the DSLAM 130 receives a new I picture in the bitstream and begins to send it to the STB 150, and until the entire I picture is received at the STB 150. Because I pictures are typically larger than other coded picture types, the transmission delay is typically larger than the coded picture rate. The present invention may reduce both of these two identified components of the channel change latency. First, because the channel change stream I pictures are of a lower bitrate than normal I pictures, they may occur more frequently in the bitstream, reducing the waiting time until a new I picture is available. Secondly, because the channel change stream coded pictures are of a lower bitrate than the normal stream coded pictures, the transmission time for the first channel change I picture to be received at the STB 150 is reduced.

Since the channel change stream coded representation of the video sequence is of a lower quality than the normal stream, the user will experience lower video quality during a short transition period immediately following a channel change request. After this initial transition period, the full quality of the normal stream is observed. If only I pictures are present in the channel change stream, the subsequent P and B pictures in the normal stream are decoded using the channel change I picture, which differs from the normal stream I picture that they were encoded with respect to, resulting in prediction drift.

The coded pictures in the channel change stream may be of lower resolution than the pictures in the normal stream, in which case they are upsampled at the video decoder 154 prior to storing in the reference picture stores. The video decoder 154 must be signaled in some way that upsampling should be performed, for example an additional parameter could be added to the slice header.

Figure 2:
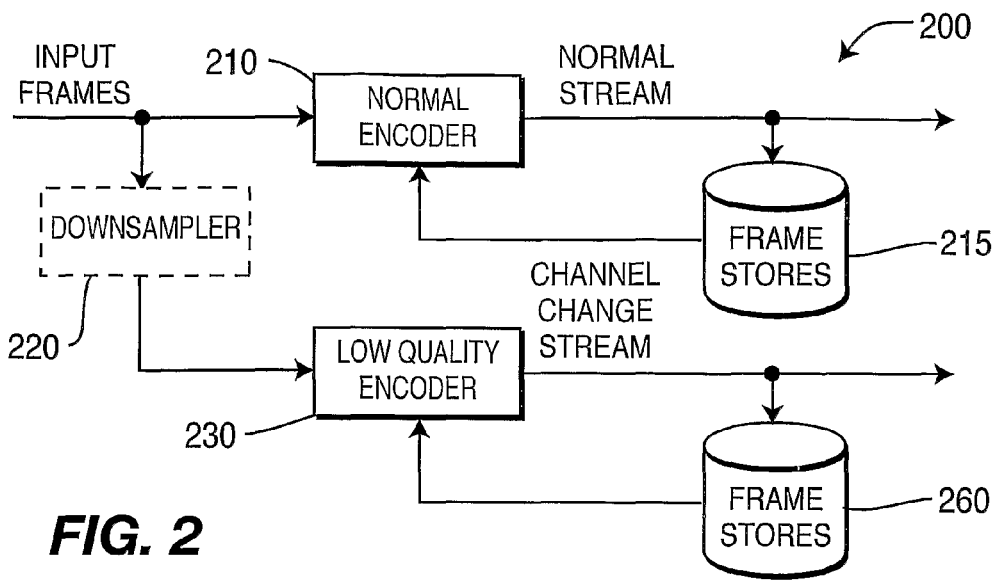
FIG. 2 shows a block diagram for a video encoder with lower resolution channel change stream pictures in accordance with the principles of the present invention.

Turning to FIG. 2, a video encoder 200 with lower resolution channel change stream pictures is indicated generally by the reference numeral 200. In the video encoder 200, channel change stream pictures are coded at a lower quality and possibly lower resolution than normal stream pictures. Lower quality could be achieved through the use of higher quantizer values, or the use of the Reduced Resolution Update mode. An input of the video encoder 200 is connected in signal communication with a first input of a normal video encoder 210. A second input of the normal video encoder 210 is connected in signal communication with an output of frames stores 215. An output of the normal video encoder 210 is connected in signal communication with an input of the frames stores 215. The output of the normal video encoder 210 is also an externally available output of the video encoder 200. The input of the video encoder 200 is further connected in signal communication with an input of an optional downsampler 220. An output of the downsampler 220 is connected in signal communication with a first input of a low quality encoder 230. It is to be appreciated that in the event that optional downsampler 220 is not employed, then the input of the encoder 200 is further connected in signal communication with the first input of the low quality encoder 230. A second input of the low quality encoder 230 is connected in signal communication with an output of frames stores 260. An output of the low quality encoder 230 is connected in signal communication with an input of the frames stores 260. The output of the low quality encoder 230 is also an externally available output of the video encoder 200.

The optional downsampler 220 reduces the resolution of the input video, and the downsampled video is encoded using the lower quality encoder 230, to create the channel change stream. The selection of encoding a channel change picture at lower resolution can be done at the encoder and can depend on the bitrate and quality requirements set by the broadcast provider. The input video is encoded with the normal video encoder 210 to create the normal stream.

Figure 3:
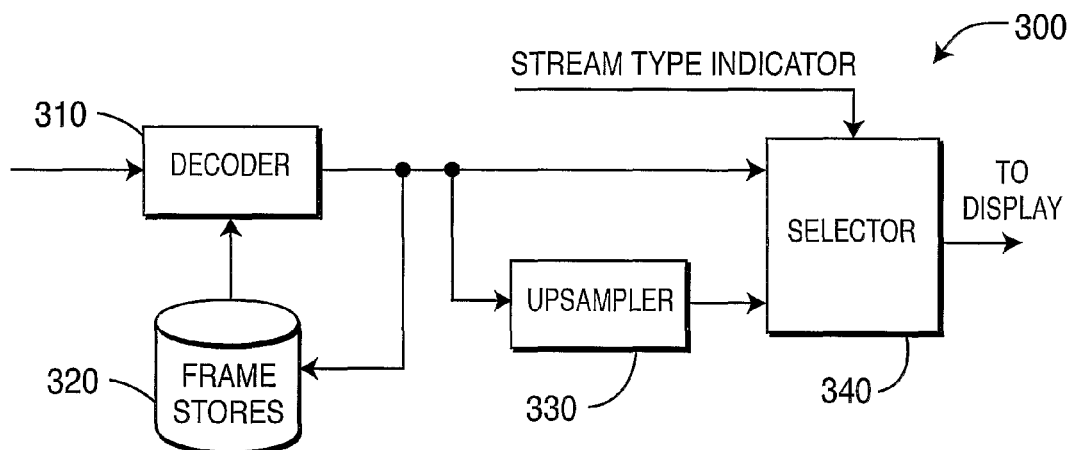
FIG. 3 shows a block diagram for a video decoder with lower resolution channel change stream pictures in accordance with the principles of the present invention.

Turning to FIG. 3, a video decoder with lower resolution channel change stream pictures is indicated generally by the reference numeral 300. In the video decoder 300, channel change stream pictures are coded at a lower resolution than the normal stream pictures. An input of the video decoder 300 is connected in signal communication with a first input of a video decoder 310. A second input of the video decoder 310 is connected in signal communication with an output of frames stores 320. An output of the video decoder 310 is connected in signal communication with an input of frames stores 320. The output of the video decoder 310 is further connected in signal communication with an input of an upsampler 330, and with a first input of a selector 340. An output of the upsampler 330 is connected in signal communication with a second input of the selector 340. An output of the selector 340 is an externally available output of the decoder 300. Either the normal stream or the channel change stream coded pictures are decoded, and the decoded pictures are stored in the frame stores 320. If the current picture is from the channel change stream, it might be required that the current picture is upsampled prior to display. If the current picture is from the normal stream, upsampling is unnecessary, and the decoded picture is displayed. This system applies when after a channel change, the DSLAM 130 switches back to the normal stream when an I picture is being sent.

Figure 4:
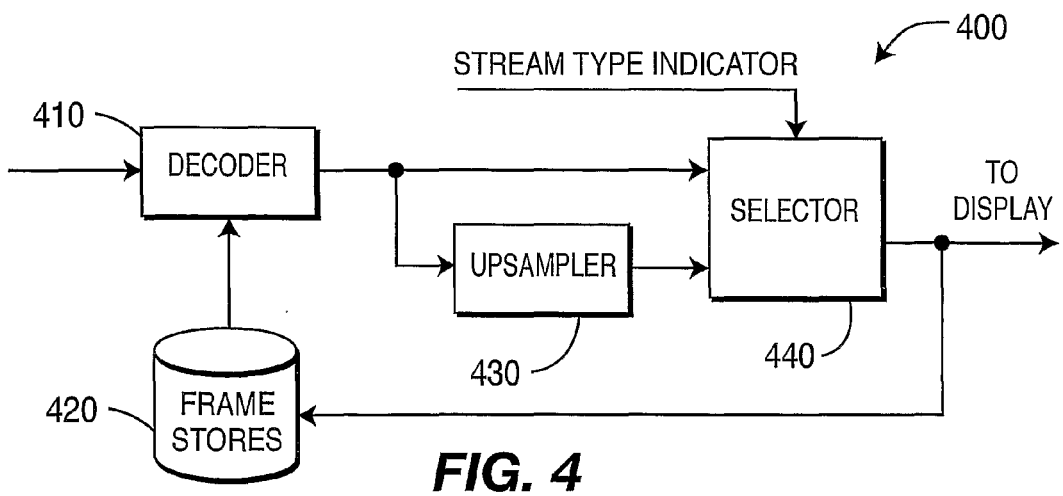
FIG. 4 shows a block diagram for an alternate video decoder with lower resolution channel change stream pictures in accordance with the principles of the present invention.

Turning to FIG. 4, an alternate video decoder with lower resolution channel change stream pictures is indicated generally by the reference numeral 400. An input of the video decoder 400 is connected in signal communication with a first input of a video decoder 410. A second input of the video decoder 410 is connected in signal communication with an output of frames stores 420. An output of the video decoder 410 is connected in signal communication with an input of an upsampler 430 and with a first input of a selector 440. An output of the upsampler 430 is connected in signal communication with a second input of the selector 440. An output of the selector 440 is connected in signal communication with an input of the frames stores 420. The output of the selector 440 is an externally available output of the decoder 400.

The alternative video decoder 400 is used when the first normal stream pictures transmitted after the channel change are P or B pictures, in which case prediction drift occurs. This is because the P and B pictures are decoded at the video decoder using the channel change I picture as a reference rather than the normal stream I picture with which those P and B pictures were encoded with respect to. In this case, the low resolution channel change stream picture is upsampled after decoding. The upsampled pictures are used for display and are also stored in the frame stores for use in decoding later normal stream pictures. Again when normal stream coded pictures are decoded, no upsampling is necessary.

The channel change stream coded video sequence may be at a lower frame rate than the normal stream, that is, fewer coded pictures may be present in the channel change stream than in the normal stream. The video decoder may simply display those pictures that it receives from the channel change stream for additional picture display times.

If a Reduced Resolution Update video encoder and decoder are employed, the upsampling and downsampling blocks that already exist in the encoder and decoder may be reused for the channel change stream picture upsampling.

When the channel change stream GOP is stored in the DSLAM 130, its associated audio is also stored. When the channel change stream video coded pictures are selected for transmission to the STB 150, the audio associated with those pictures is also transmitted.

Turning to FIG. 5, in a Digital Subscriber Line Access Multiplexer (DSLAM) of a DSL system with prediction drift, a method for enabling a channel change is indicated generally by the reference numeral 500. A begin block 510 passes control to a decision block 520, which determines whether or not a channel change request has been received to play a current program. If the channel change request has not been received, then control passes back to decision block 520. Otherwise, if the channel change request has been received, then control passes to a function block 530 that sends a channel change stream coded I picture. The function block 530 passes control to a function block 540 that sends a normal stream coded picture. The function block 540 passes control to a decision block 550 that determines whether or not a channel change request has been received to exit a current program. If the channel change request has not been received, then control passes back to function block 540. Otherwise, if the channel change request has been received, then control passes to an end block 560.

Turning to FIG. 6, in a Digital Subscriber Line Access Multiplexer (DSLAM) of a DSL system without prediction drift, a method for enabling a channel change is indicated generally by the reference numeral 600. A begin block 610 passes control to a decision block 620 that determines whether or not a channel change request has been received to play a current program. If the channel change request has not been received, then control passes back to the decision block 620. Otherwise, if the channel change request has been received, then control passes to a function block 630 that sends a channel change stream coded picture. The function block 630 passes control to a decision block 640 that determines whether or not an I picture is available in the normal stream. If an I picture is not available, then control passes back to function block 630. Otherwise, if an I picture is available, then control passes to a function block 650 that sends a normal stream coded picture. The function block 650 passes control to a decision block 660 that determines whether or not a channel change request has been received to exit a current program. If the channel change request has not been received, then control passes back to the decision block 640. Otherwise, if the channel change request has been received, then control passes to an end block 670.

Figure 7:
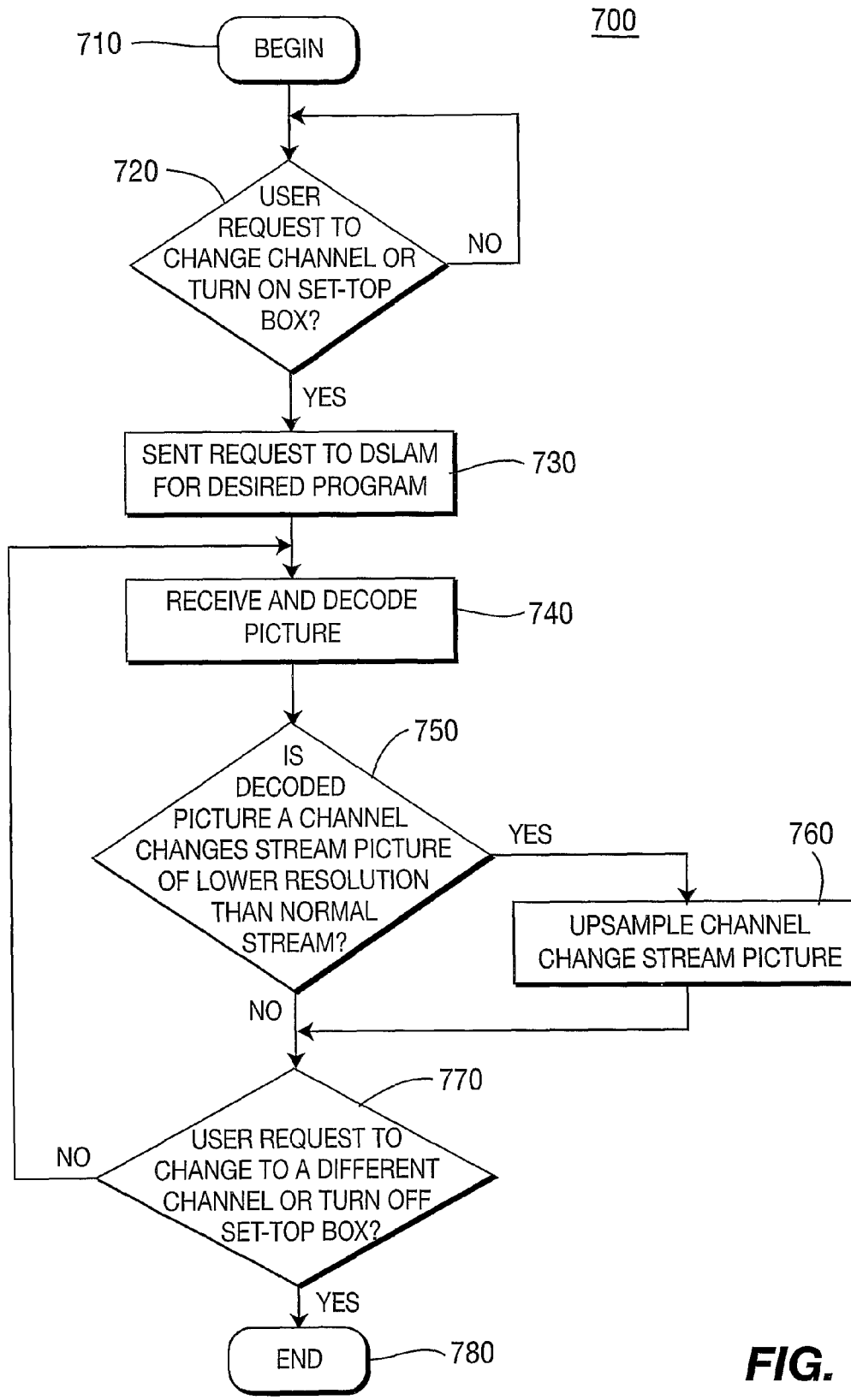
FIG. 7 shows a flow diagram for a method for decoding a channel change stream in a set top box of a Digital Subscriber Line (DSL) System in accordance with the principles of the present invention.

Turning to FIG. 7, a method for decoding a channel change stream in a set top box of a Digital Subscriber Line (DSL) System is indicated generally by the reference numeral 700. The DSL system includes a DSL Access Multiplexer (DSLAM). A begin block 710 passes control to a decision block 720 that determines whether or not a user request has been received to change a channel or turn on a set top box. If the user request has not been received, then control passes back to decision block 720. Otherwise, if the user request has been received, then control passes to a function block 730 that sends the request to the DSLAM for the desired program. The function block 730 passes control to a function block 740 that receives and decodes a picture, and passes control to a decision block 750. The decision block 750 determines whether or not the decoded picture is a channel change stream picture of lower resolution than the normal stream. If the decoded picture is a channel change stream picture of lower resolution than the normal stream, then control passes to a function block 760 that upsamples the channel change stream picture. Otherwise, if the decoded picture is not a channel change stream picture of lower resolution than the normal stream, then control passes to a decision block 770 that determines whether or not a user request has been received to change to a different channel or to turn off the set top box. If the user request has not been received, then control passes back to function block 740. Otherwise, if the user request has been received, then control passes to an end block 780.

It is to be appreciated that the present invention may be applied to transmission systems other than DSL systems, while maintaining the spirit of the present invention. The key requirements for application are that the video encoder be connected via a network to a channel change processing unit. The channel change processing unit is in turn connected via a network to a video decoder.

A description will now be given of some of the many attendant advantages/features of various embodiments of the present invention. For example, an advantage/feature an embodiment of the present invention is a channel change processing unit that receives normal stream and channel change stream, stores the channel change stream, and sends the channel change stream pictures following a channel change request. Another advantage/feature of an embodiment of the present invention is a channel change processing unit as described above, wherein the first coded picture sent from the channel change stream is an I picture. Yet another advantage/feature associated with an embodiment of the present invention is a channel change processing unit as described above, wherein the channel change stream coded pictures are of lower resolution than the normal stream coded pictures. A further advantage/feature associated with an embodiment of the present invention is a channel change processing unit as described above, wherein the channel change stream coded pictures are of lower frame rate than the normal stream coded pictures. Another advantage/feature associated with an embodiment of the present invention is a channel change processing unit as described above, wherein the channel change stream coded pictures are coded at a lower bitrate than the normal stream pictures. Still another advantage/feature associated with an embodiment of the present invention is a channel change processing unit as described above, wherein the channel change stream coded pictures use RRU. Moreover, another advantage/feature associated with an embodiment of the present invention is a channel change processing unit as described above, wherein only an I picture is stored and sent in the channel change stream following a channel change request. Furthermore, another advantage associated with an embodiment of the present invention is a channel change processing unit as described above, wherein after the channel change stream pictures are sent, a switch is made to sending the normal stream pictures. Still another advantage associated with an embodiment of the present invention is a channel change processing unit as described above, wherein a single GOP's worth of channel change pictures are stored, and then are replaced as a new GOP arrives.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. An apparatus that enables a channel change comprising:
   a demultiplexer that accesses a normal stream and a channel change stream, wherein the normal stream and the channel change stream correspond to the same video program and are multiplexed together before transmission to a decoder; and
   a selector in signal communication with said demultiplexer that receives a channel change request and sends the channel change stream in response to receiving the channel change request,
   wherein the channel change stream coded pictures are of a lower quality than the normal stream coded pictures,
   wherein said demultiplexer and said selector are disposed at a remote location with respect to a viewing location at which the normal stream and the channel change stream are viewed by a viewer,
   wherein a first coded picture in the channel change stream sent by said selector in response to receiving the channel change request is an I picture, and
   wherein said selector limits an amount of data sent over a local loop in signal communication with the apparatus and the viewing location by selecting, at any given time, only one of either the normal stream and the channel change stream to send to the viewing location for viewing by the viewer.

2. The apparatus as defined in claim 1, further comprising a memory device in signal communication with said demultiplexer and said selector, wherein the memory device stores the channel change stream.

3. The apparatus as defined in claim 1, wherein the channel change stream includes channel change stream coded pictures, the normal stream includes normal stream coded pictures, and the channel change stream coded pictures are of a lower resolution than the normal stream coded pictures.

4. The apparatus as defined in claim 1, wherein the channel change stream includes channel change stream coded pictures, the normal stream includes normal stream coded pictures, and the channel change stream coded pictures are of a lower frame rate than the normal stream coded pictures.

5. The apparatus as defined in claim 1, wherein the channel change stream includes channel change stream coded pictures, the normal stream includes normal stream coded pictures, and the channel change stream coded pictures are coded at a lower bitrate that the normal stream coded pictures.

6. The apparatus as defined in claim 1, wherein the channel change stream includes channel change stream coded pictures that use Reduced Resolution Update.

7. The apparatus as defined in claim 1, wherein only an I picture is sent in the channel change stream in response to receiving the channel change request.

8. The apparatus as defined in claim 1, wherein the channel change stream includes channel change stream coded pictures, the normal stream includes normal stream coded pictures, and said selector switches to sending the normal stream coded pictures after the channel change stream coded pictures have been sent.

9. The apparatus as defined in claim 2, wherein said memory device stores channel change stream coded pictures for a single Group of Pictures (GOP), and then replaces the channel change stream coded pictures for the GOP as a new GOP is received.

10. The apparatus of claim 1, wherein the remote location corresponds to a digital subscriber line access multiplexer (DSLAM).

11. An apparatus that enables a channel change, the apparatus comprising:
    a user interface that initiates a change, at a remote location with respect to a location of the apparatus, by receiving a channel change request from a viewer and forwarding the channel change request to the remote location; and
    a decoder that receives, from the remote location, and decoding a normal stream and a channel change stream, wherein the normal stream and the channel change stream correspond to the same video program and are multiplexed together before transmission, the normal stream having normal stream coded pictures and the channel change stream having channel stream coded pictures of a lower quality than the normal stream coded pictures,
    wherein a first coded picture in the channel change stream received by the apparatus from the remote location is an I picture,
    wherein said decoder receives, at any given time, only one of the normal stream and the channel change stream.

12. The apparatus as defined in claim 11, further comprising an upsampler in signal communication with said decoder for upsampling a current channel stream coded picture included in the channel change stream prior to display of the current picture.

13. The apparatus as defined in claim 11, wherein the channel change stream coded pictures are of a lower resolution than the normal stream coded pictures.

14. The apparatus as defined in claim 11, wherein the channel change stream coded pictures use Reduced Resolution Update.

15. The apparatus as defined in claim 11, wherein said decoder receives the channel change stream in response to a transmission of the channel change request from a set top box.

16. The apparatus of claim 11, wherein the remote location corresponds to a digital subscriber line access multiplexer (DSLAM).

17. In a digital subscriber line access multiplexer (DSLAM), a method for enabling a channel change, comprising the steps of:
    accessing a normal stream and a channel change stream, wherein the normal stream and the channel change stream correspond to the same video program and are multiplexed together before transmission to a decoder;
    receiving a channel change request from a viewing location at which the normal stream and the channel change stream are viewed by a viewer, the viewing location being remote from a location of the DSLAM; and
    selecting and sending the channel change stream to the viewing location in response to receiving the channel change request,
    wherein the channel change stream coded pictures are of a lower quality than the normal stream coded pictures,
    wherein a first coded picture in the channel change stream sent to the viewing location in response to receiving the channel change request is an I picture, and
    wherein said selecting, limits an amount of data sent over a local loop in signal communication with the DSLAM and the viewing location by selecting, at any given time, only one of the normal stream and the channel change stream to send to the viewing location for viewing by the viewer.

18. The method as defined in claim 17, further comprising the step of locally storing the channel change stream.

19. The method as defined in claim 17, wherein the channel change stream includes channel change stream coded pictures, the normal stream includes normal stream coded pictures, and the channel change stream coded pictures are of a lower resolution than the normal stream coded pictures.

20. The method as defined in claim 17, wherein the channel change stream includes channel change stream coded pictures, the normal stream includes normal stream coded pictures, and the channel change stream coded pictures are of a lower frame rate than the normal stream coded pictures.

21. The method as defined in claim 17, wherein the channel change stream includes channel change stream coded pictures, the normal stream includes normal stream coded pictures, and the channel change stream coded pictures are coded at a lower bitrate that the normal stream coded pictures.

22. The method as defined in claim 17, wherein the channel change stream includes channel change stream coded pictures that use Reduced Resolution Update.

23. The method as defined in claim 17, wherein said sending step comprises the step of sending only an I picture in the channel change stream in response to receiving the channel change request.

24. The method as defined in claim 17, wherein the channel change stream includes channel change stream coded pictures, the normal stream includes normal stream coded pictures, and said sending step comprises the step of sending the normal stream coded pictures after the channel change stream coded pictures have been sent.

25. The method as defined in claim 18, wherein said storing step comprises the step of storing channel change stream coded pictures for a single Group of Pictures (GOP), and the method further comprises the step of replacing the channel change stream coded pictures for the GOP as a new GOP is received.

26. In a receiver, a decoding method for enabling a channel change, the method comprising the steps of:
    initiating a change, at a remote location with respect to a location of the receiver by receiving a channel change request from a viewer and forwarding the channel change request to the remote location, wherein a normal stream and a channel change stream corresponding to the same video program are multiplexed together before transmission; and
    receiving at any given time, only one of the normal stream and the channel change stream from the remote location and decoding the received stream, the normal stream having normal stream coded pictures and the channel change stream having channel stream coded pictures of a lower quality than the normal stream coded pictures,
    wherein a first coded picture in the channel change stream received by the receiver from the remote location is an I picture.

27. The method as defined in claim 26, further comprising the step of upsampling a current channel stream coded picture included in the channel change stream prior to display of the current picture.

28. The method as defined in claim 26, wherein the channel change stream coded pictures are of a lower resolution than the normal stream coded pictures.

29. The method as defined in claim 26, wherein the channel change stream coded pictures use Reduced Resolution Update.

30. The method of claim 26, wherein the remote location corresponds to a digital subscriber line access multiplexer (DSLAM).

* * * * *